(12) United States Patent
Khani et al.

(10) Patent No.: US 11,533,468 B2
(45) Date of Patent: Dec. 20, 2022

(54) SYSTEM AND METHOD FOR GENERATING A MIXED REALITY EXPERIENCE

(71) Applicant: Samsung Electronics Co., Ltd., Suwon-si (KR)

(72) Inventors: Aamer Khani, Dublin, CA (US); Parvinder Sawhney, Fremont, CA (US); Papiya Nath, Santa Clara, CA (US); Shigong Liu, Los Gatos, CA (US); Yi Jin, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/681,623

(22) Filed: Nov. 12, 2019

(65) Prior Publication Data

US 2020/0413031 A1 Dec. 31, 2020

Related U.S. Application Data

(60) Provisional application No. 62/867,627, filed on Jun. 27, 2019.

(51) Int. Cl.
*H04N 13/341* (2018.01)
*G06F 3/04815* (2022.01)
(Continued)

(52) U.S. Cl.
CPC ......... *H04N 13/341* (2018.05); *G02B 27/017* (2013.01); *G02B 30/25* (2020.01);
(Continued)

(58) Field of Classification Search
CPC ..... G06T 7/00; G06T 19/006; G06F 3/04845; H04N 13/341
See application file for complete search history.

(56) References Cited

U.S. PATENT DOCUMENTS 10,078,919 B2  9/2018  Powderly et al.
10,134,186 B2  11/2018  Schowengerdt et al.
(Continued)

FOREIGN PATENT DOCUMENTS

CN  106154707 B  1/2018
JP  2019517049 A  6/2019
(Continued)

OTHER PUBLICATIONS

International Search Report and Written Opinion of the International Searching Authority in connection with International Application No. PCT/KR2020/008146 dated Oct. 13, 2020, 9 pages.

*Primary Examiner* — Kyle M Lotfi

(57) ABSTRACT

An electronic device includes an image sensor, a projector, an adjustable mount, a processor, and a memory. The memory stores instructions executable by the processor to: receive at least one image of an environment around the electronic device from the image sensor; determine a face pose of a viewer based on the at least one image; determine characteristics of a projection surface based on the at least one image; control the projector to project a plurality of images onto the projection surface, the images determined based in part on the face pose of the viewer and the characteristics of the projection surface, wherein the images are configured to be perceived as a three-dimensional (3D) object image when viewed through 3D glasses; and control the adjustable mount to adjust a position or an orientation of the projector based in part on a change in the face pose of the viewer.

20 Claims, 13 Drawing Sheets

(51) Int. Cl.
  *G06F 3/01*   (2006.01)
  *G06F 3/0488* (2022.01)
  *H04N 13/398* (2018.01)
  *G02B 30/25*  (2020.01)
  *G02B 27/01*  (2006.01)
  *G06V 40/20*  (2022.01)

(52) U.S. Cl.
  CPC .............. *G06F 3/011* (2013.01); *G06F 3/017* (2013.01); *G06F 3/0488* (2013.01); *G06F 3/04815* (2013.01); *G06V 40/28* (2022.01); *H04N 13/398* (2018.05)

(56) References Cited

U.S. PATENT DOCUMENTS

| | | |
|---|---|---|
| 10,297,082 B2 | 5/2019 | Wilson et al. |
| 10,300,389 B2 | 5/2019 | Ackley et al. |
| 2013/0222381 A1 | 8/2013 | Di Censo et al. |
| 2016/0070356 A1* | 3/2016 | Aguirre .................. G06F 3/011 345/156 |
| 2017/0099481 A1* | 4/2017 | Held .................... G02B 27/017 |
| 2017/0109938 A1 | 4/2017 | Hilliges et al. |
| 2018/0246698 A1 | 8/2018 | Huang |
| 2019/0121522 A1 | 4/2019 | Davis et al. |
| 2020/0074743 A1* | 3/2020 | Zheng .................... G06T 15/20 |
| 2020/0334851 A1* | 10/2020 | Hansson .............. G03B 21/145 |
| 2020/0368616 A1* | 11/2020 | Delamont ............... A63F 13/25 |

FOREIGN PATENT DOCUMENTS

| | | |
|---|---|---|
| KR | 10-2018-0069947 A | 6/2018 |
| WO | 2019014718 A1 | 1/2019 |

\* cited by examiner

SYSTEM AND METHOD FOR GENERATING A MIXED REALITY EXPERIENCE

CROSS-REFERENCE TO RELATED APPLICATION AND PRIORITY CLAIM

This application claims priority under 35 U.S.C. § 119(e) to U.S. Provisional Patent Application No. 62/867,627 filed on Jun. 27, 2019, which is hereby incorporated by reference in its entirety.

TECHNICAL FIELD

This disclosure relates generally to mixed reality. More specifically, this disclosure relates to a system and method for generating a mixed reality experience.

BACKGROUND

Virtual reality (VR), augmented reality (AR), and mixed reality (MR) technologies are becoming more and more common as the availability of VR, AR, and MR headsets and other devices continues to expand. Virtual reality generally refers to technology that creates an artificial simulation or recreation of an environment, which may or may not be a real-world environment. Augmented reality generally refers to technology in which computer-generated content is superimposed over a real-world environment. Mixed reality generally refers to technology in which computer-generated content is superimposed over or replaces a real-world environment, where computer-generated objects are anchored to or interact with physical objects in the real-world environment. In some situations implementing augmented or mixed reality, head mounted displays (HMD) may be used. However, these HMDs are generally very bulky and/or expensive.

SUMMARY

This disclosure provides a system and method for generating a mixed reality experience.

In a first embodiment, an electronic device includes an image sensor; a projector; an adjustable mount; a processor coupled to the image sensor, the projector, and the adjustable mount; and a memory coupled to the processor. The memory stores instructions executable by the processor to receive at least one image of an environment around the electronic device from the image sensor. The memory also stores instructions executable by the processor to determine a face pose of a viewer based on the at least one image. The memory also stores instructions executable by the processor to determine characteristics of a projection surface based on the at least one image. The memory also stores instructions executable by the processor to control the projector to project a plurality of images onto the projection surface, the images determined based in part on the face pose of the viewer and the characteristics of the projection surface, wherein the images are configured to be perceived as a three-dimensional (3D) object image when viewed through 3D glasses. The memory also stores instructions executable by the processor to control the adjustable mount to adjust a position or an orientation of the projector based in part on a change in the face pose of the viewer.

In a second embodiment, a method includes receiving, from an image sensor, at least one image of an environment around a mixed reality projection device. The method also includes determining a face pose of a viewer based on the at least one image. The method also includes determining characteristics of a projection surface based on the at least one image. The method also includes projecting a plurality of images onto the projection surface using a projector, the images determined based in part on the face pose of the viewer and the characteristics of the projection surface, wherein the images are configured to be perceived as a three-dimensional (3D) object image when viewed through 3D glasses. The method also includes adjusting a position or an orientation of the projector based in part on a change in the face pose of the viewer.

In a third embodiment, a non-transitory computer readable medium contains computer readable program code that, when executed, causes at least one processor to receive at least one image of an environment around a mixed reality projection device from an image sensor; determine a face pose of a viewer based on the at least one image; determine characteristics of a projection surface based on the at least one image; control a projector to project a plurality of images onto the projection surface, the images determined based in part on the face pose of the viewer and the characteristics of the projection surface, wherein the images are configured to be perceived as a three-dimensional (3D) object image when viewed through 3D glasses; and control an adjustable mount to adjust a position or an orientation of the projector based in part on a change in the face pose of the viewer.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B.

As used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member,"

"apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
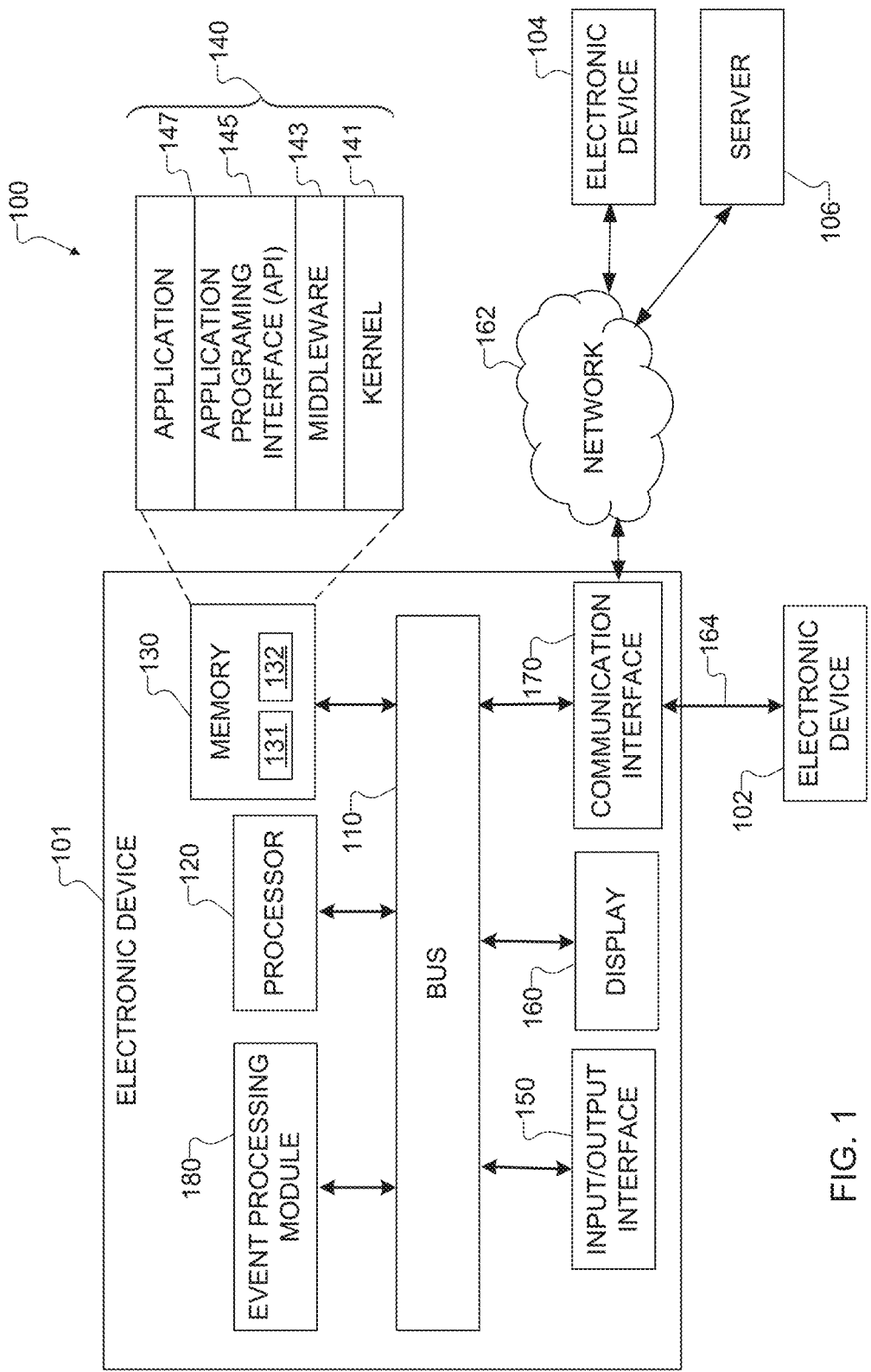
FIG. 1 illustrates an example network configuration in accordance with this disclosure.

The figures discussed below and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference numerals may be used to refer to the same or similar elements throughout the specification and the drawings.

As noted above, head mounted displays (HMD) are often used in implementations of augmented or mixed reality. Examples of such HMDs include MICROSOFT HOLOLENS 2 and MAGIC LEAP ONE. However, these HMDs are generally very bulky, expensive, or both.

To address these and other issues, this disclosure provides systems and methods for generating a mixed reality experience. In some embodiments, a system may include a three dimensional (3D) projector and accompanying glasses. In some embodiments, a system may include components (e.g., a sensor, mobile phone, or the like) for detecting distances. In some embodiments, a motorized mount with pan and tilt capabilities may be used to increase the display area.

FIG. 1 illustrates an example network configuration 100 in accordance with this disclosure. As shown in FIG. 1, according to embodiments of this disclosure, an electronic device 101 is included in the network configuration 100. The electronic device 101 may include at least one of a bus 110, a processor 120, a memory 130, an input/output (I/O) interface 150, a display 160, a communication interface 170, or an event processing module 180. In some embodiments, the electronic device 101 may exclude at least one of the components or may add another component.

The bus 110 may include a circuit for connecting the components 120-180 with one another and transferring communications (such as control messages and/or data) between the components. The processor 120 may include one or more of a central processing unit (CPU), an application processor (AP), or a communication processor (CP). The processor 120 may perform control on at least one of the other components of the electronic device 101 and/or perform an operation or data processing relating to communication.

The memory 130 may include a volatile and/or non-volatile memory. For example, the memory 130 may store commands or data related to at least one other component of the electronic device 101. According to embodiments of this disclosure, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted an operating system (OS).

The kernel 141 may control or manage system resources (such as the bus 110, processor 120, or memory 130) used to perform operations or functions implemented in other programs (such as the middleware 143, API 145, or application program 147). The kernel 141 may provide an interface that allows the middleware 143, API 145, or application 147 to access the individual components of the electronic device 101 to control or manage the system resources. The middleware 143 may function as a relay to allow the API 145 or the application 147 to communicate data with the kernel 141, for example. A plurality of applications 147 may be provided. The middleware 143 may control work requests received from the applications 147, such as by allocating the priority of using the system resources of the electronic device 101 (such as the bus 110, processor 120, or memory 130) to at least one of the plurality of applications 147. The API 145 is an interface allowing the application 147 to control functions provided from the kernel 141 or the middleware 143. For example, the API 145 may include at least one interface or function (such as a command) for file control, window control, image processing, or text control.

The input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external devices.

The display 160 may include, for example, a liquid crystal display (LCD), a light emitting diode (LED) display, an organic light emitting diode (OLED) display, a quantum light emitting diode (QLED) display, a microelectromechanical systems (MEMS) display, or an electronic paper display. The display 160 can also be a depth-aware display, such as a multi-focal display. The display 160 may display various contents (such as text, images, videos, icons, or symbols) to the user. The display 160 may include a touchscreen and may receive, for example, a touch, gesture, proximity, or hovering input using an electronic pen or a body portion of the user.

The communication interface 170 may set up communication between the electronic device 101 and an external electronic device (such as a first electronic device 102, a second electronic device 104, or a server 106). For example, the communication interface 170 may be connected with a network 162 or 164 through wireless or wired communication to communicate with the external electronic device.

The first external electronic device 102 or the second external electronic device 104 may be a wearable device or an electronic device 101—mountable wearable device (such as a head mounted display (HMD)). When the electronic device 101 is mounted in an HMD (such as the electronic device 102), the electronic device 101 may detect the mounting in the HMD and operate in a virtual reality mode. When the electronic device 101 is mounted in the electronic device 102 (such as the HMD), the electronic device 101 may communicate with the electronic device 102 through the communication interface 170. The electronic device 101 may be directly connected with the electronic device 102 to communicate with the electronic device 102 without involving a separate network.

The wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of, for example, universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 each may be a device of the same type or a different type from the electronic device 101. According to embodiments of this disclosure, the server 106 may include a group of one or more servers. Also, according to embodiments of this disclosure, all or some of the operations executed on the electronic device 101 may be executed on another or multiple other electronic devices (such as the electronic devices 102 and 104 or server 106). Further, according to embodiments of this disclosure, when the electronic device 101 should perform some function or service automatically or at a request, the electronic device 101, instead of executing the function or service on its own or additionally, may request another device (such as electronic devices 102 and 104 or server 106) to perform at least some functions associated therewith. The other electronic device (such as electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

While FIG. 1 shows that the electronic device 101 includes the communication interface 170 to communicate with the external electronic device 102 or 104 or server 106 via the network(s) 162 and 164, the electronic device 101 may be independently operated without a separate communication function, according to embodiments of this disclosure. Also, note that the electronic device 102 or 104 or the server 106 could be implemented using a bus, a processor, a memory, an I/O interface, a display, a communication interface, and an event processing module (or any suitable subset thereof) in the same or similar manner as shown for the electronic device 101.

The server 106 may operate to drive the electronic device 101 by performing at least one of the operations (or functions) implemented on the electronic device 101. For example, the server 106 may include an event processing server module (not shown) that may support the event processing module 180 implemented in the electronic device 101. The event processing server module may include at least one of the components of the event processing module 180 and perform (or instead perform) at least one of the operations (or functions) conducted by the event processing module 180. The event processing module 180 may process at least part of the information obtained from other elements (such as the processor 120, memory 130, input/output interface 150, or communication interface 170) and may provide the same to the user in various manners.

While the event processing module 180 is shown to be a module separate from the processor 120 in FIG. 1, at least a portion of the event processing module 180 may be included or implemented in the processor 120 or at least one other module, or the overall function of the event processing module 180 may be included or implemented in the processor 120 shown or another processor. The event processing module 180 may perform operations according to embodiments of this disclosure in interoperation with at least one program 140 stored in the memory 130.

As described in more detail below, at least one device of the network configuration 100 (such as an electronic device 101, 102, 104 or server 106) performs operations to generate and project one or more mixed reality images that can be viewed by a user wearing 3D glasses. The mixed reality images, when seen by the user through the 3D glasses, have the appearance of a 3D image projecting from a surface. As discussed below, one or more devices of the network configuration 100 can form a system that includes a 3D projector and an image sensor.

Although FIG. 1 illustrates one example of a network configuration 100, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
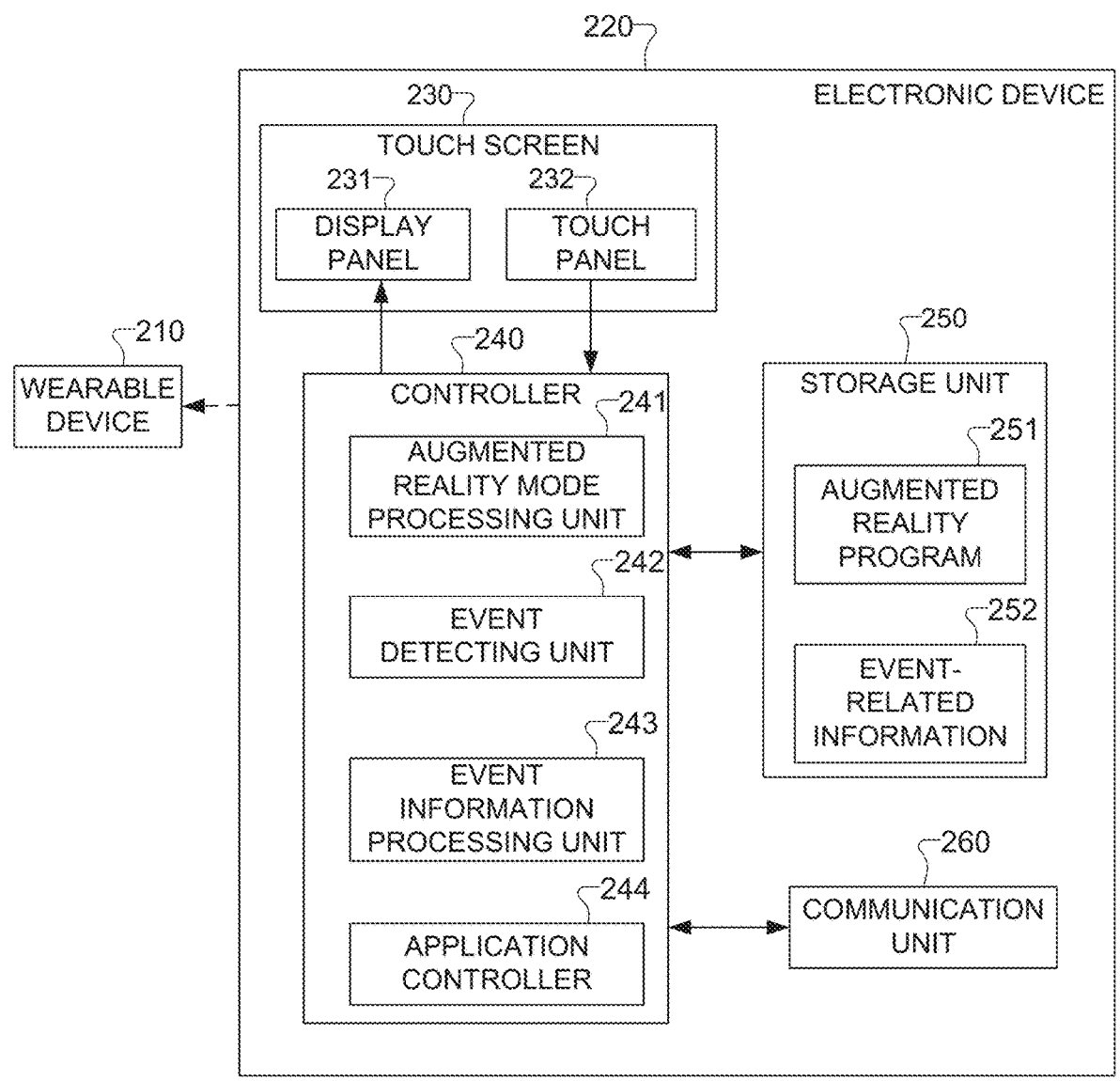
FIG. 2 illustrates an example configuration of an electronic device in accordance with this disclosure.

FIG. 2 illustrates an example configuration of an electronic device 220 in accordance with this disclosure. The electronic device 220 shown in FIG. 2 could, for example, be used as any of the electronic devices 101, 102, 104 shown in FIG. 1 and described above. However, the electronic devices 101, 102, 104 shown in FIG. 1 could be implemented in any other suitable manner. In the following description, the electronic device 220 could be a device primarily performing a display function or could denote a normal electronic device including at least one display. For example, the electronic device 220 could be an electronic device (such as a smartphone or smart watch) having a display.

As shown in FIG. 2, according to embodiments of this disclosure, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event detecting unit 242, an event information processing unit 243, or an application controller 244.

In some embodiments, when the electronic device 220 is mounted in a wearable device 210, the electronic device 220 can operate, for example, as an HMD and run an augmented reality mode. Further, according to embodiments of this disclosure, even when the electronic device 220 is not mounted in the wearable device 210, the electronic device 220 can run the augmented reality mode according to the user's settings or run an augmented reality mode-related application. In the following discussion, although the electronic device 220 is set to be mounted in the wearable device 210 to run the augmented reality mode, embodiments of this disclosure are not limited to this specific implementation.

According to some embodiments, when the electronic device 220 operates in the augmented reality mode (such as when the electronic device 220 is mounted in the wearable device 210 to operate in a head mounted theater (HMT) mode), two screens corresponding to the user's eyes (left eye and right eye) can be displayed through the display panel 231. Also, according to some embodiments, when the electronic device 220 is operated in the augmented reality mode, the controller 240 can control the processing of information related to an event generated while operating in the augmented reality mode to fit in the augmented reality mode and display the processed information. Further, according to some embodiments, when the event generated while operating in the augmented reality mode is an event related to running an application, the controller 240 can block the running of the application or process the application to operate as a background process or application.

As noted above, the controller 240 can include at least one of the augmented reality mode processing unit 241, the event detecting unit 242, the event information processing unit 243, or the application controller 244 to perform functions according to various embodiments of this disclosure. Embodiments of this disclosure can be implemented to perform various operations or functions as described below using at least one component of the electronic device 220, such as the touchscreen 230, controller 240, or storage unit 250.

According to some embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Also, the event detecting unit 242 can determine whether there is information to be displayed on the display screen of the electronic device 220 (such as the touchscreen 230) in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode (depending on the result of the determination by the event detecting unit 242). Various methods for processing event-related information can apply. For example, when a three-dimensional (3D) image is implemented in the augmented reality mode, the electronic device 220 may convert the event-related information to fit the 3D image. As a particular example, event-related information being displayed in two dimensions (2D) can be converted into left and right eye information corresponding to the 3D image, and the converted information can be synthesized and displayed on the display screen of the augmented reality mode being currently run.

According to some embodiments, when it is determined by the event detecting unit 242 that there is an application to be run in relation with the event occurring while operating in the augmented reality mode, the application controller 244 may perform control to block the running of the application related to the event. Also, according to some embodiments, when it is determined by the event detecting unit 242 that there is an application to be run in relation with the event occurring while operating in the augmented reality mode, the application controller 244 may perform control so that the application is run in the background so as not to influence the running or screen display of the application corresponding to the augmented reality mode when the event-related application runs.

The storage unit 250 can store the augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

In some embodiments, the wearable device 210 can be an electronic device including at least one function of the electronic device 101 shown in FIG. 1, and the wearable device 210 can be a wearable stand to which the electronic device 220 can be mounted. In cases where the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether it has been mounted on the wearable device 210 for communication with the wearable device 210 and can determine whether to operate in the augmented reality mode (or an HMT mode).

According to some embodiments, upon failure to automatically determine whether the electronic device 220 is mounted when the communication unit 260 is mounted on the wearable device 210, the user can run the augmented reality program 251 or select the augmented reality mode (or the HMT mode). Also, according to some embodiments, when the wearable device 210 functions with or as part of the electronic device 220, the wearable device 210 can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 180 or processor 120 of the electronic device 101 shown in FIG. 1. Also, the touchscreen 230 or display panel 231 shown in FIG. 2 can correspond to the display 160 of FIG. 1. Further, the storage unit 250 shown in FIG. 2 can correspond to the memory 130 of FIG. 1. While the touchscreen 230 in FIG. 2 includes the display panel 231 and the touch panel 232, according to other embodiments of this disclosure, the display panel 231 or the touch panel 232 may also be provided as a separate panel rather than being combined in a single touchscreen 230. Also, according to embodiments of this disclosure, the electronic device 220 can include the display panel 231 but exclude the touch panel 232.

According to some embodiments, the electronic device 220 can be denoted as a first device (or a first electronic device), and the wearable device 210 may be denoted as a second device (or a second electronic device) for ease of description. Also, according to some embodiments, the electronic device 220 can include a display unit (such as the touchscreen 230) that displays on a screen corresponding to an augmented reality mode. The electronic device 220 can also include a controller 240 performing control that detects an interrupt according to an occurrence of at least one event, varies event-related information related to the event in a form corresponding to the augmented reality mode, and displays the varied event-related information on the display screen that corresponds to the augmented reality mode. According to some embodiments, the event can include any one or more selected from among a call reception event, a message reception event, an alarm notification, a scheduler notification, a Wi-Fi connection, a Wi-Fi disconnection, a low battery notification, a data permission or use restriction notification, a no application response notification, or an abnormal application termination notification.

According to some embodiments, the electronic device 220 further includes a storage unit 250 configured for storing the event-related information when the event is not an event to be displayed in the augmented reality mode, where the controller 240 can perform control to display the event-related information stored in the storage unit 250 when the electronic device 220 switches from an augmented reality mode into a non-augmented reality mode. Also, according to some embodiments, the electronic device 220 can further include a storage unit 250 that stores information regarding at least one event to be displayed in the augmented reality mode. According to some embodiments, the event can include an instant message reception notification event.

According to some embodiments, when the event is an event related to running at least one application, the controller 240 can perform control that blocks running of the application according to occurrence of the event. According to some embodiments, the controller 240 can perform control to run the blocked application when a screen mode of the electronic device switches from an augmented reality mode into a non-augmented reality mode. According to some embodiments, when the event is an event related to running at least one application, the controller 240 can perform control that enables the application, according to the occurrence of the event, to be run on a background of a screen of the augmented reality mode. According to some embodiments, when the electronic device 220 is connected with a wearable device 210, the controller 240 can perform control to run the augmented reality mode. According to some embodiments, the controller 240 can enable the event-related information to be arranged and processed to be displayed in a 3D space of the augmented reality mode screen being displayed on a current display screen. According to some embodiments, the electronic device 220 can include additional sensors, such as one or more red, green, blue (RGB) cameras, dynamic vision sensor (DVS) cameras, 360 degree cameras, or a combination thereof.

Although FIG. 2 illustrates one example of a configuration of an electronic device 220, various changes may be made to FIG. 2. For example, computing and communication devices come in a wide variety of configurations, and FIG. 2 does not limit this disclosure to use with this one specific implementation of an electronic device 220.

Figure 3:
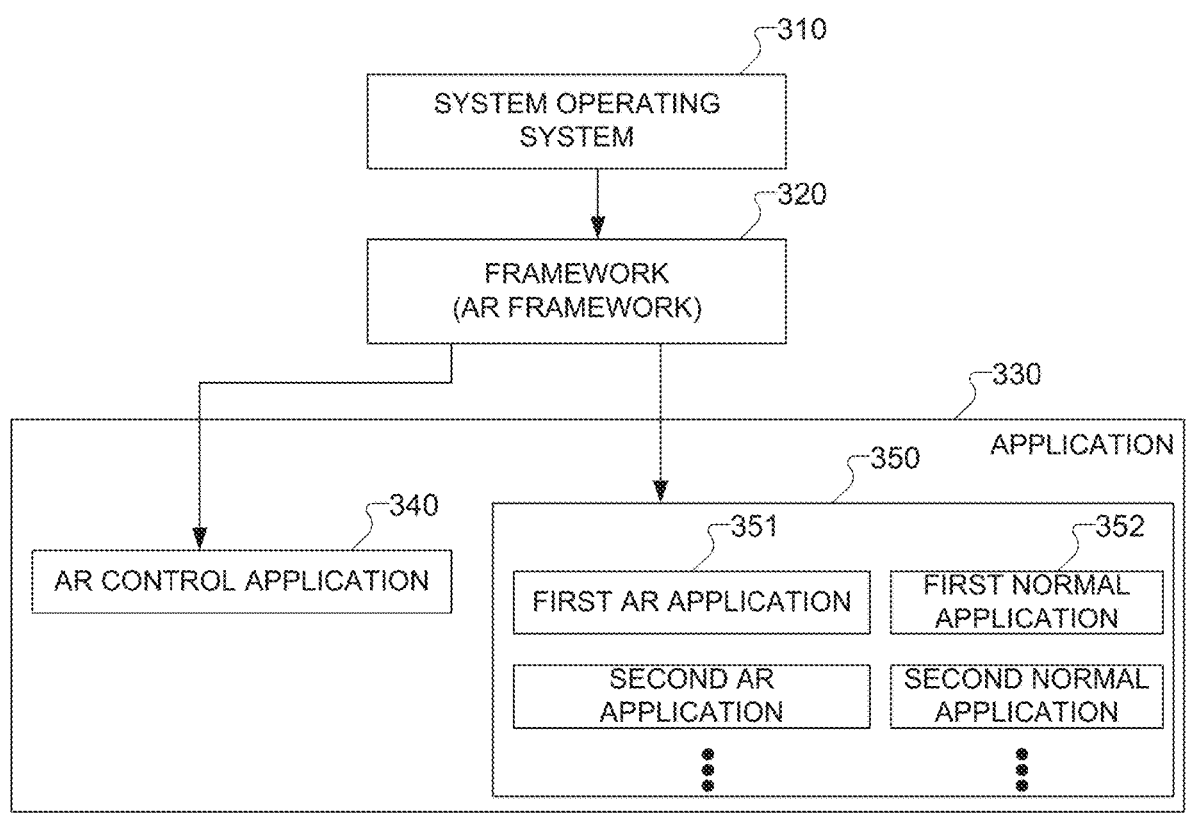
FIG. 3 illustrates an example program module in accordance with this disclosure.

FIG. 3 illustrates an example program module in accordance with this disclosure. The program module shown in FIG. 3 could, for example, be used in any of the electronic devices 101, 102, 104, 220 shown in FIGS. 1 and 2 and described above. However, the electronic devices 101, 102, 104, 220 shown in FIGS. 1 and 2 could be implemented in any other suitable manner.

As shown in FIG. 3, the program module in this example can include a system operating system (OS) 310, a framework 320, and at least one application 330. The system OS 310 can include at least one system resource manager or at least one device driver. The system resource manager can perform, for example, control, allocation, or recovery of system resources. The system resource manager may include at least one manager, such as a process manager, memory manager, or file system manager. The device driver may include at least one driver, such as, for example, a display driver, camera driver, BLUETOOTH driver, shared memory driver, USB driver, keypad driver, Wi-Fi driver, audio driver, or inter-process communication (IPC) driver.

According to some embodiments, the framework 320 (such as middleware) can provide, for example, functions commonly required by an application or provide the application with various functions through an API to allow the application to efficiently use limited system resources inside an electronic device. The AR framework included in the framework 320 can control functions related to augmented reality mode operations on the electronic device. For example, when running an augmented reality mode operation, the AR framework 320 can control at least one AR application 351, which is related to some form of augmented reality, among applications 330 so as to provide the augmented reality mode on the electronic device.

The application(s) 330 can include a plurality of applications and can include at least one AR application 351 running in the augmented reality mode and at least one normal application 352 running in a non-augmented reality mode. The application(s) 330 can further include an AR control application 340. An operation of the at least one AR application 351 and/or at least one normal application 352 can be controlled by the AR control application 340.

When at least one event occurs while the electronic device operates in the augmented reality mode, the system OS 310 can notify the framework 320, such as the AR framework, of an occurrence of an event. The framework 320 can then control the running of the normal application 352 so that event-related information can be displayed on the screen for the event occurring in the non-augmented reality mode but not in the augmented reality mode. When there is an application to be run in relation with the event occurring in the normal mode, the framework 320 can perform or provide control to run at least one normal application 352.

According to some embodiments, when an event occurs while operating in the augmented reality mode, the framework 320, such as the AR framework, can block the operation of at least one normal application 352 to display the information related to the occurring event. The framework 320 can provide the event occurring, while operating in the augmented reality mode, to the AR control application 340. The AR control application 340 can process the information related to the event occurring while operating in the augmented reality mode to fit within the operation of the augmented reality mode. For example, 2D planar event-related information can be processed into 3D information. The AR control application 340 can control at least one AR application 351 currently running and can perform control to synthesize the processed event-related information for display on the screen being run by the AR application 351 and display the result.

According to some embodiments, when an event occurs while operating in the augmented reality mode, the framework 320 can perform control to block the running of at least one normal application 352 related to the occurring event. Also, according to some embodiments, when an event occurs while operating in the augmented reality mode, the framework 320 can perform control to temporarily block the running of at least one normal application 352 related to the occurring event, and then (when the augmented reality mode terminates) the framework 320 can perform control to run the blocked normal application 352. Further, according to some embodiments, when an event occurs while operating in the augmented reality mode, the framework 320 can control the running of at least one normal application 352 related to the occurring event so that the at least one normal application 352 related to the event operates in the background so as not to influence the screen used by the AR application 351 currently running.

Although FIG. 3 illustrates one example of a program module that can be used in an electronic device, various changes may be made to FIG. 3. For example, the program module can include any suitable number of AR-related applications and any suitable number of non-AR-related applications. Also, embodiments described in connection with FIG. 3 are examples for implementing embodiments of this disclosure in the form of a program, and embodiments of this disclosure are not limited thereto and can be implemented in other various forms. Further, while the embodiments described in connection with FIG. 3 reference AR, such embodiments may also be applied to other scenarios such as virtual reality, mixed reality, etc. In such embodiments, the AR portions or components may be utilized to enable the virtual reality or mixed reality aspects. Collectively the various reality scenarios may be referred to herein as XR.

Figure 4:
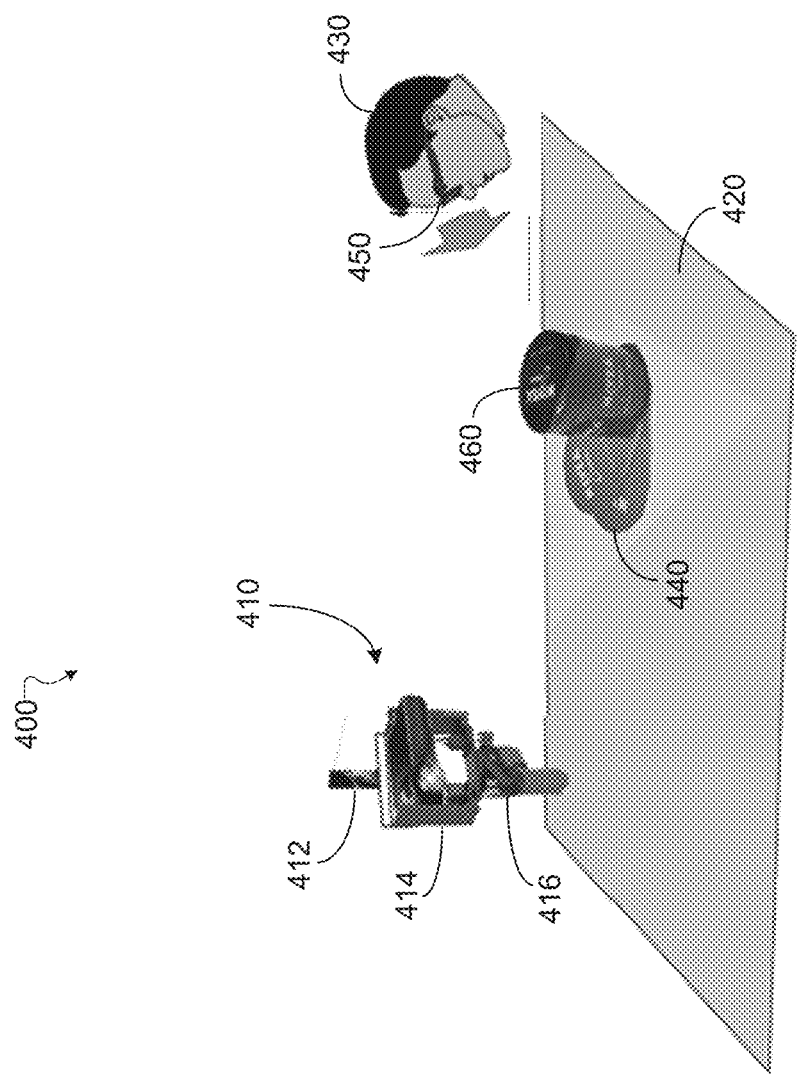
FIG. 4 illustrates an example environment in which a mixed reality image is projected and viewed by a user in accordance with this disclosure.

FIG. 4 illustrates an example environment 400 in which a mixed reality image is projected and viewed by a user in accordance with this disclosure. The environment 400 shown in FIG. 4 could be used in conjunction with any of the devices or modules shown in FIGS. 1 through 3 and described above.

As shown in FIG. 4, the environment 400 includes a projection system 410, a projection surface 420, and a user 430. The projection system 410 can project multiple images 440 onto the projection surface 420. In some embodiments, the images 440 include one image that corresponds to a left channel and the user's left eye, and one image that corresponds to a right channel and the user's right eye. Once the images 440 are projected onto the surface 420, the images 440 can be viewed by the user 430 while the user 430 is wearing 3D glasses 450. The 3D glasses 450 enable the user 430 to perceive the multiple images 440 as a 3D image 460.

The projection system 410 includes an image sensor 412, a 3D projector 414, and an adjustable mount 416. The image sensor 412 detects or receives image information associated with the surrounding environment 400. The image information can include single or multiple still image frames. Additionally or alternatively, the image information can include video comprising multiple image frames. For example, the image sensor 412 can detect or receive image information of the face orientation and position of the user 430, and detect or receive image information of the orientation and position of the projection surface 420. The image sensor 412 includes any suitable structure for detecting or receiving image information associated with the environment 400. In some embodiments, the image sensor 412 can include a camera, a mobile phone, a depth sensor, other types of sensors, or a combination of two or more of these. The image sensor 412 can represent (or be represented by) the electronic device 101, 102, 104 of FIG. 1 or the electronic device 220 of FIG. 2.

In some embodiments, the image sensor 412 obtains the image information, generates projection data from the image information, and outputs the projection data to the 3D projector 414, so that the 3D projector 414 renders the projection data into the projected images 440. In other embodiments, the image sensor 412 outputs the image information to the 3D projector 414, and the 3D projector 414 processes the image information in order to render and output the projected images 440. In still other embodiments, the image sensor 412 obtains the image information, and outputs the image information to an electronic device (e.g., the electronic device 101), so that the electronic device generates the projection data and outputs the projection data to the 3D projector 414. While the images 440 have been described as including one image corresponding to the user's left eye and one image corresponding to the user's right eye, the images 440 could also include multiple images for each eye, such as a video image stream for each eye. The 3D projector 414 includes any suitable structure for generating and projecting the images 440 onto the projection surface 420. The 3D projector 414 can represent (or be represented by) the electronic device 101, 102, 104 of FIG. 1 or the electronic device 220 of FIG. 2.

The 3D projector 414 may be attached to the adjustable mount 416. The adjustable mount 416 allows adjustment of the orientation of the 3D projector 414 and extends the area where the projection beam from the 3D projector 414 can be cast. In some embodiments, the adjustable mount 416 may be controlled by a controller in the projection system 410. For example, when the image sensor 412 includes a mobile phone, the adjustable mount 416 may receive control signals from the mobile phone to move or adjust the adjustable mount 416. In some embodiments, the adjustable mount 416 may include a motorized pan and tilt mount. In some embodiments, the adjustable mount 416 may include one or more manual adjustment mechanisms, including knobs, levers, slides, gears, and the like. In some embodiments, the adjustable mount 416 may include one or more other movement or power mechanisms, including casters, a ball, movable legs, a single wheel, springs, rotors, propellers, rails, tracks, pneumatics, hydraulics, wind-up mechanisms, springs, and the like. Of course, these are merely examples, and embodiments of this disclosure are not limited thereto and can be implemented in other various forms.

The projection surface 420 includes any suitable surface for displaying a projected image so as to be viewed by one or more users. The projection surface 420 may be a substantially flat, planar surface. As shown in FIG. 4, the projection surface 420 is oriented horizontally. However, in other embodiments, the projection surface 420 could be oriented vertically, such as a wall or projector screen, or at any suitable angle between horizontal and vertical that allows viewing of the projected image by each user. Also, in some embodiments, all or part of the projection surface 420 may be curved instead of flat.

Although FIG. 4 illustrates one example configuration of an environment 400 in which a mixed reality image is projected and viewed by a user, various changes may be made to FIG. 4. For example, the size, location, orientation, and quantity of the components in the environment 400 are for illustration only, and FIG. 4 does not limit this disclosure to use with this one specific environment 400.

Figure 5:
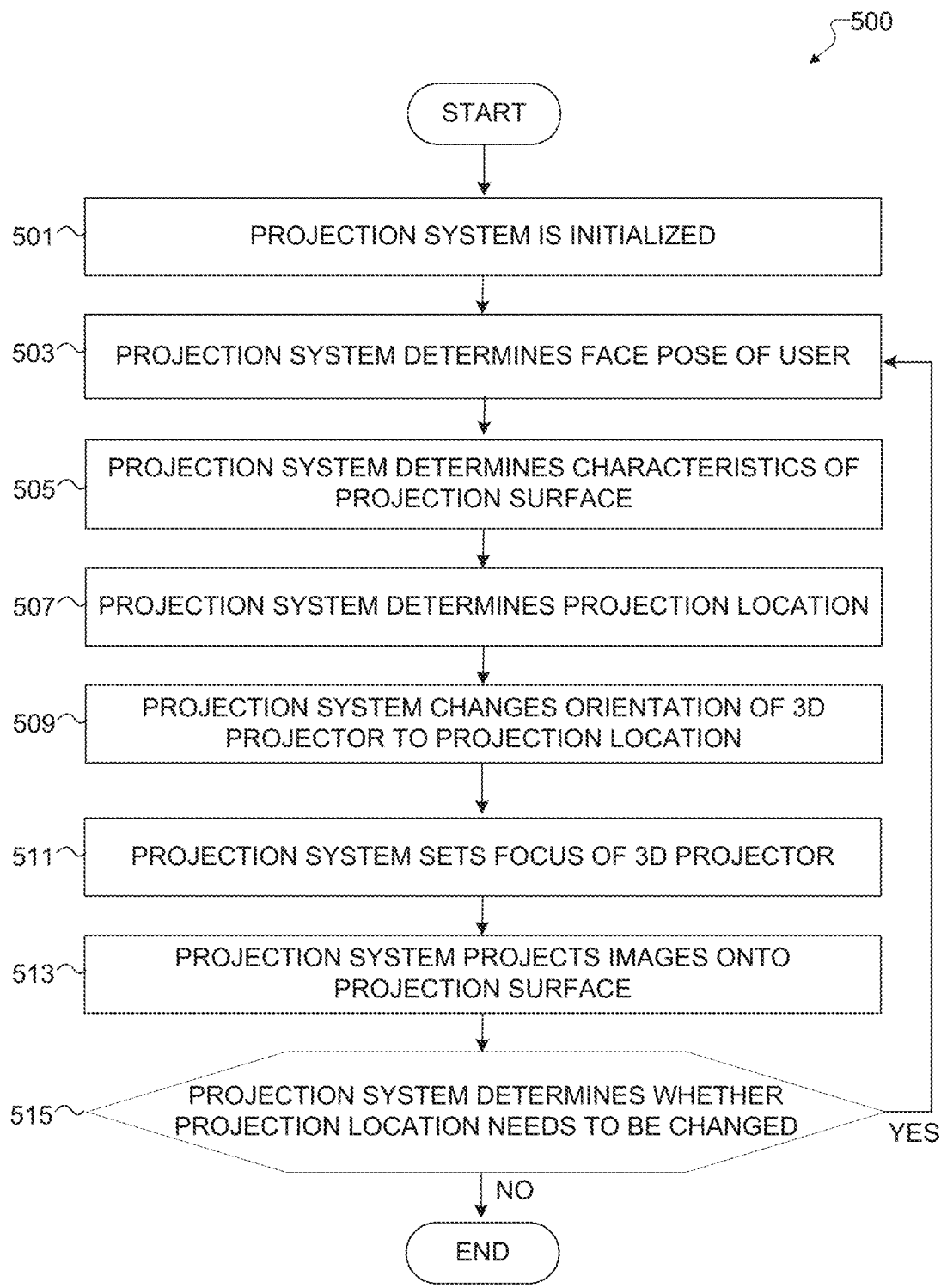
FIG. 5 illustrates an example method for projecting a mixed reality image in accordance with this disclosure.
Figure 6A:
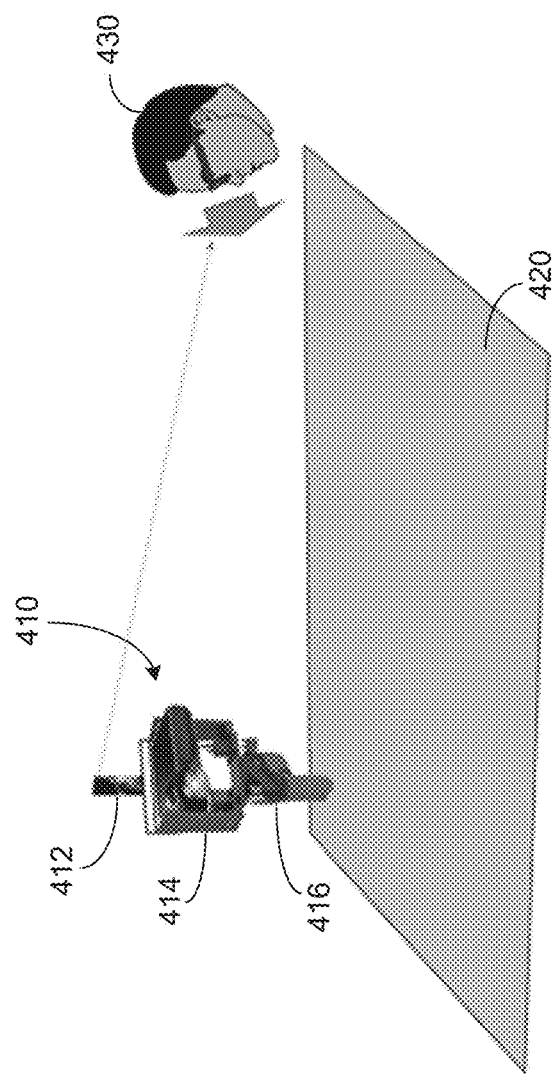
FIGS. 6A through 6C illustrate certain operations of the method of FIG. 5 in accordance with this disclosure.
Figure 6B:
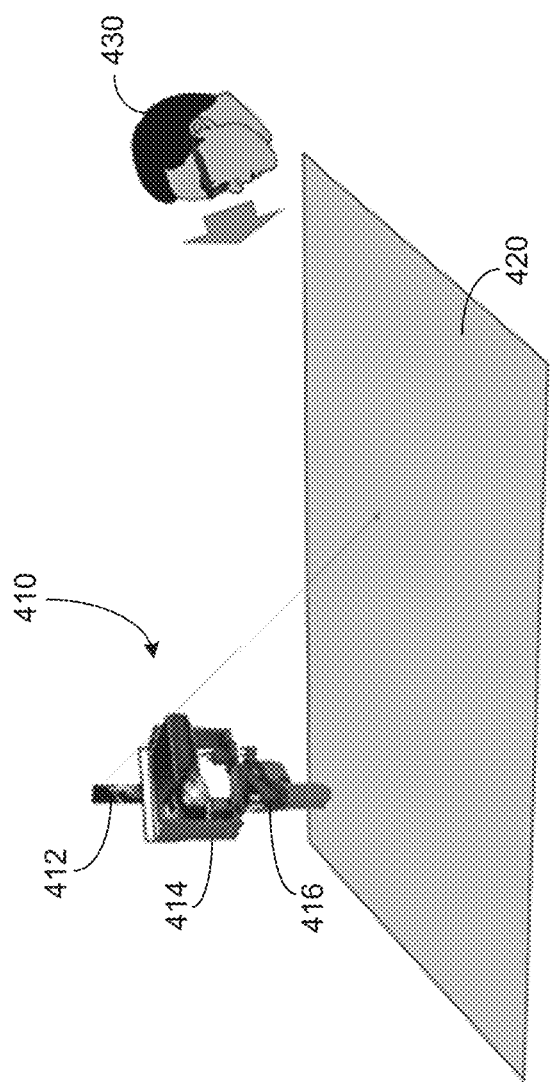
Figure 6C:
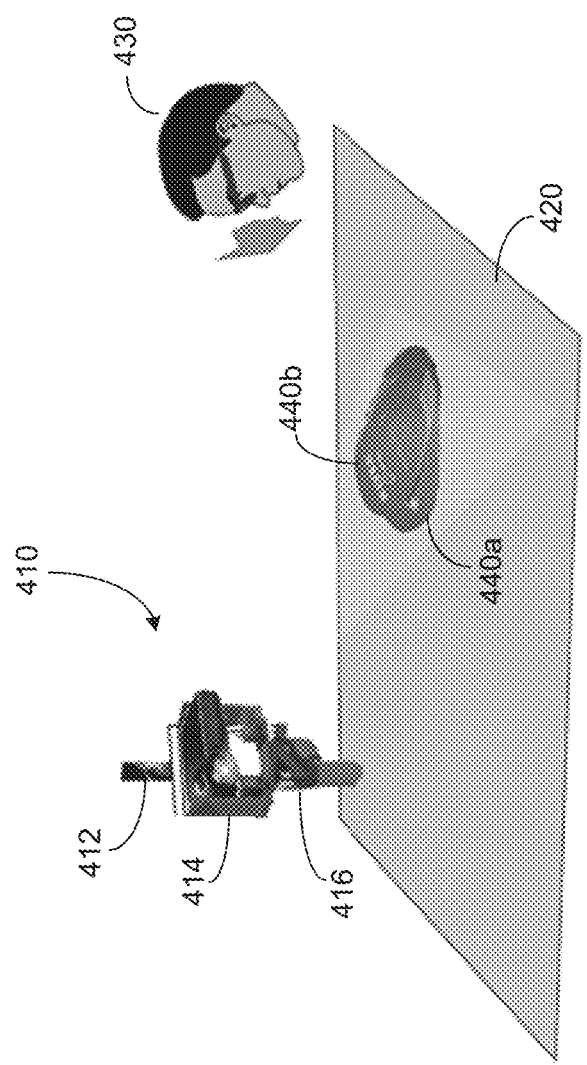

FIG. 5 illustrates an example method 500 for projecting a mixed reality image in accordance with this disclosure. For ease of explanation, the method 500 shown in FIG. 5 may be described as being performed within the environment 400 shown in FIG. 4. In particular, the method 500 may be performed by the projection system 410. However, the method 500 shown in FIG. 5 may be performed using any other suitable device or system in any other suitable environment. FIGS. 6A through 6C illustrate certain operations of the method 500 for greater understanding.

As shown in FIG. 5, at step 501, the projection system 410 is initialized. This can include, for example, the projection system 410 being positioned near the projection surface 420 and powered on or otherwise started.

At step 503, the projection system 410 determines a face pose of the user 430. This can include, for example, the image sensor 412 determining both the orientation and the position of the face of the user 430, as shown in FIG. 6A. This can also include the image sensor determining the orientations and positions of the left eye and right eye of the user 430 and the interpupillary distance between the eyes. In some embodiments, the projection system 410 can communicate to the user 430 to gaze at the projection surface 420. Once the user 430 looks at the projection surface 420, the image sensor 412 detects the orientation and position of the face of the user 430, and determines a direction vector from the user's face that corresponds to the direction that the user 430 is looking. The image sensor 412 may use one or more face pose tracking libraries (e.g., GOOGLE AUGMENTED FACES, or the like) to determine the face position and orientation.

At step 505, the projection system 410 determines characteristics of the projection surface 420. This can include, for example, the image sensor 412 determining the orientation, position, and topography of the projection surface 420 while being oriented toward the projection surface 420, as shown in FIG. 6B. In some embodiments, the image sensor 412 rotates and/or pans (e.g., by movement of the adjustable mount 416) to collect surface information of the projection surface 420 in the area around the location where the user 430 is gazing. The speed of the rotation and/or panning may be adjustable depending on the amount of surface information needed to determine the projection surface. The image sensor 412 may use one or more augmented reality runtime libraries (e.g., GOOGLE AR CORE, or the like) to determine the position, orientation, and topography of the projection surface 420.

At step 507, the projection system 410 determines a projection location on the projection surface 420 where the projection of the images 440 will occur. This can include, for example, the image sensor 412 or the 3D projector 414 determining the point of intersection between the direction vector of the face of the user 430 and the projection surface 420. The point of intersection is determined to be the projection location where projection of the images 440 will occur. Alternatively, if the projection system 410 determines that there is no intersection between the direction vector of the user's face and the projection surface 420, then the user 430 is not looking at the projection surface 420, and images will not be projected.

At step 509, the projection system 410 changes orientation of the 3D projector 414 to correspond to the projection location. This can include, for example, the projection system 410 operating the adjustable mount 416 to move (e.g., pan and tilt) the 3D projector 414 such that the projection lens of the 3D projector 414 is aimed toward the projection location.

At step 511, the projection system 410 sets the focus of the 3D projector 414 to correspond to the projection location. This can include, for example, the projection system 410 estimating the average length of the projected beam, based on the position and orientation of the projection surface 420, and changing the focus of the 3D projector 414 to ensure clear projected images 440.

At step 513, the projection system 410 projects the images 440 onto the projection surface 420. This can include, for example, the 3D projector 414 projecting a left image 440*a* that corresponds to a left channel and the user's left eye, and a right image 440*b* that corresponds to a right channel and the user's right eye, as shown in FIG. 6C. The left and right images 440 are projected to be perspective correct for the left and right eyes, respectively. That is, the left and right images 440 are generated to be slightly different based on the viewing angle for each eye due to the interpupillary distance. Depending on the type of 3D glasses 450 worn by the user 430, the 3D projector 414 can project the first and second images 440 simultaneously or sequentially. For example, when the 3D glasses 450 include active shutters, the 3D projector 414 can alternately project the first image and the second image in a cycle that is synchronized to the active shutter cycle of the 3D glasses 450. As a result of the differing perspectives, the images 440 can be perceived by the user 430 as a 3D image 460 when the images 440 are viewed through the 3G glasses 450, such as shown in FIG. 4.

At step 515, the projection system 410 determines whether the projection location needs to be changed. This can include, for example, the projection system 410 receiving input information from the user 430 instructing the projection system 410 to change where the images 440 are projected. In other embodiments (such as scenarios where the projection system 410 is required to project within the user's gaze or field of view), this can include the projection system 410 automatically receiving or detecting updated face pose information of the user 430 and determining that the user's gaze has changed based on a detected shift in the orientation or position of the face of the user 430. If the projection system 410 determines that the projection location needs to be changed, then the method 500 returns to step 503 to determine and adjust for the new location. Otherwise, the method 500 ends.

Although FIG. 5 illustrates one example of a method 500 for projecting a mixed reality image, various changes may be made to FIG. 5. For example, while certain steps in FIG. 5 are shown as occurring in a particular order, various steps in FIG. 5 could overlap or occur in parallel. Also, various steps in FIG. 5 could occur in a different order or occur any number of times.

Figure 7:
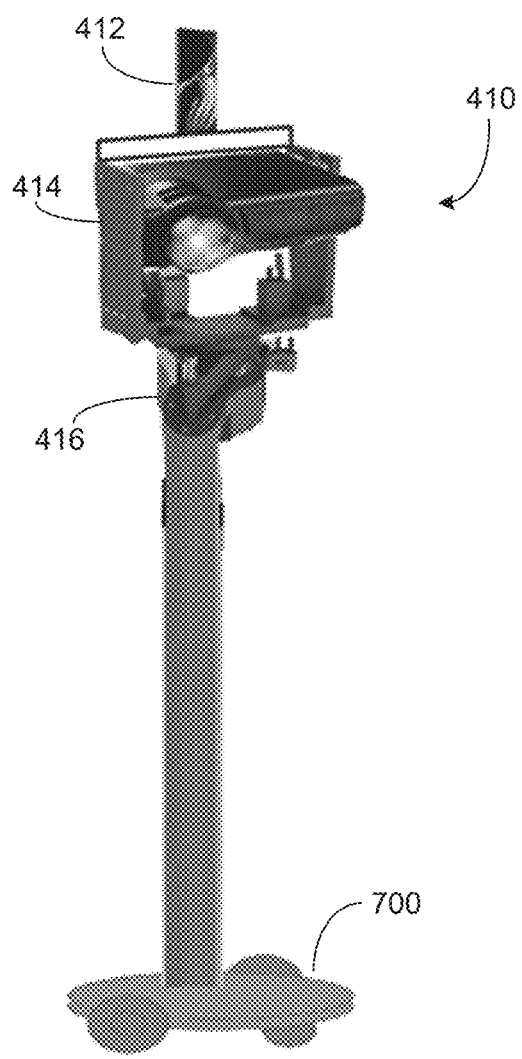
FIG. 7 illustrates an example mobile platform for mounting a projection system in accordance with this disclosure.

FIG. 7 illustrates an example mobile platform 700 for mounting a projection system in accordance with this disclosure. While the mobile platform 700 is shown with the projection system 410 of FIG. 4, the mobile platform 700 can be used with other projection systems, and the projection system 410 could be mounted on other mobile platforms.

As shown in FIG. 7, the projection system 410 is mounted on the mobile platform 700, which allows for the projection system 410 to be repositioned around the projection surface 420, moved within a room, moved from room to room, or moved so as to follow a user as the user moves within a house, office, or other environment. The mobile platform 700 may include a transport mechanism that includes at least one movement mechanism and at least one power mechanism. In some embodiments, the movement mechanism may include a plurality of wheels. However, this is merely one example. Additionally or alternatively, other movement mechanisms may be utilized, including casters, a ball, movable legs, a single wheel, springs, rotors, propellers, rails, tracks, and the like. In some embodiments, the power mechanism may utilize one or more motors to facilitate the movement. Additionally or alternatively, other power mechanisms may be used, such as pneumatics, hydraulics, wind-up mechanisms, springs, and the like. The transport mechanism may be controllable by the projection system 410 (e.g., a mobile phone comprised in the projection system 410) or by another device, such as a mobile phone of the user. For example, the projection system 410 may output control signals to the mobile platform 700, which cause the power mechanism to operate the movement mechanism, thereby moving the mobile platform to a different location. The mobile platform 700 can include any suitable structure for providing additional mobility to the projection system 410. The mobility provided by the mobile platform 700 allows the projection system 410 to provide a mixed reality experience across multiple walls, floors, tables, and other surfaces in multiple locations.

Figure 8:
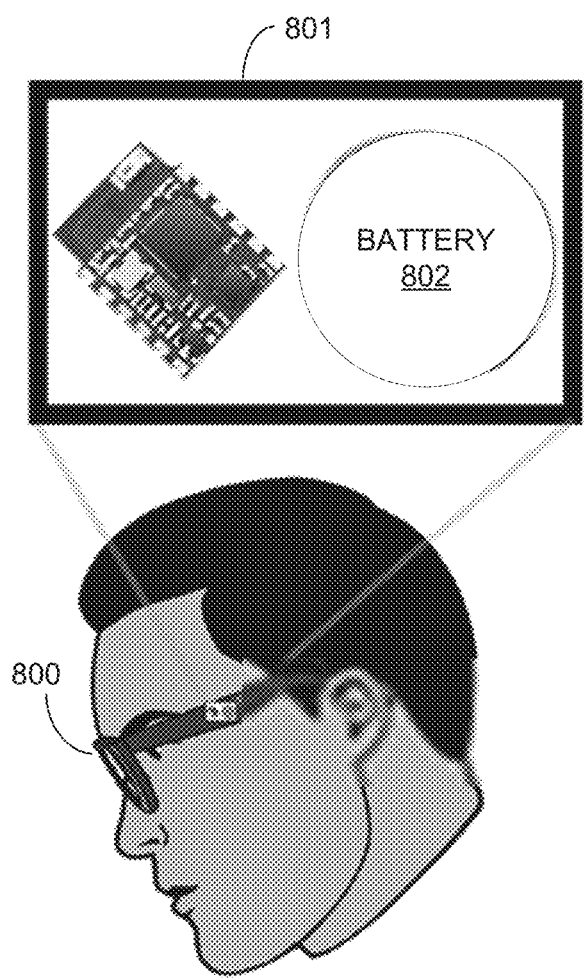
FIG. 8 illustrates an example pair of 3D glasses for use with a projection system in accordance with this disclosure.

FIG. 8 illustrates an example pair of 3D glasses 800 for use with a projection system in accordance with this disclosure. The 3D glasses 800 can represent (or be represented by) the 3D glasses 450, and can be used with the projection system 410 of FIG. 4. However, the 3D glasses 800 can be used with other projection systems, and the projection system 410 could be used with other 3D glasses.

As shown in FIG. 8, the 3D glasses 800 can include an inertial motion unit (IMU) 801 powered by a battery 802. The IMU 801 can detect position or orientation information of the user's head and provide the information to the projection system 410 (e.g., via a communication unit 260) to assist with determining and tracking the face pose of the user. The IMU 801 can include any suitable structure for detecting position or orientation information, such as one or more gyroscopes or accelerometers. In some embodiments, the IMU 801 may be a three degree of freedom (3DOF) IMU, a 6DOF IMU, or a 9DOF IMU. In some embodiments, the IMU 801 may include a communication unit configured for wireless communication directly with the projection system 410 (e.g., using BLUETOOTH protocol or another suitable communication protocol). That is, the IMU 801 may be able to provide position or orientation information of the user's head directly to the projection system 410. The information obtained by the IMU 801 and provided to the projection system 410 may improve the response time of the projection system 410 and reduce any lag. In some embodiments, the IMU 801 is an optional component; the projection system 410 is capable of operating without the presence of the IMU 801.

Figure 9A:
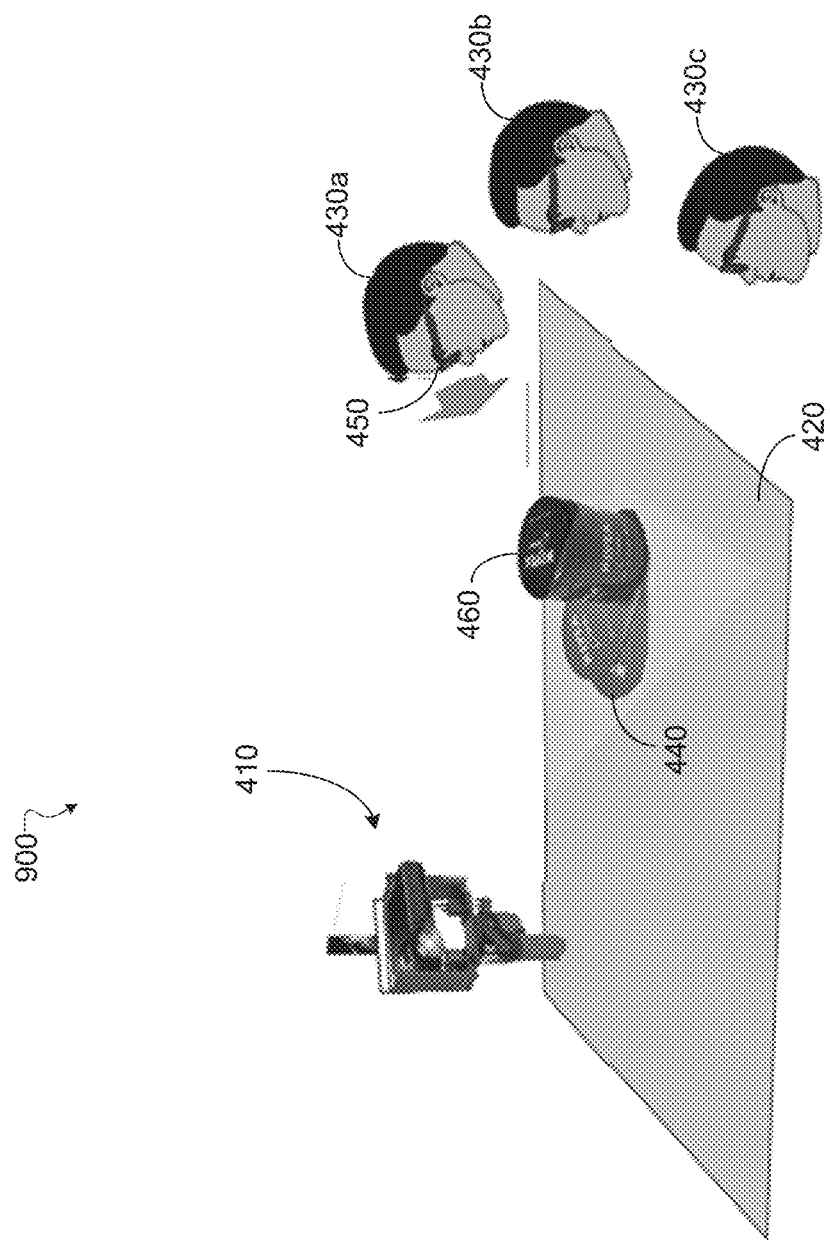
FIGS. 9A and 9B illustrate example details of multi-user support in an environment in which a mixed reality image is projected and viewed, in accordance with this disclosure.
Figure 9B:
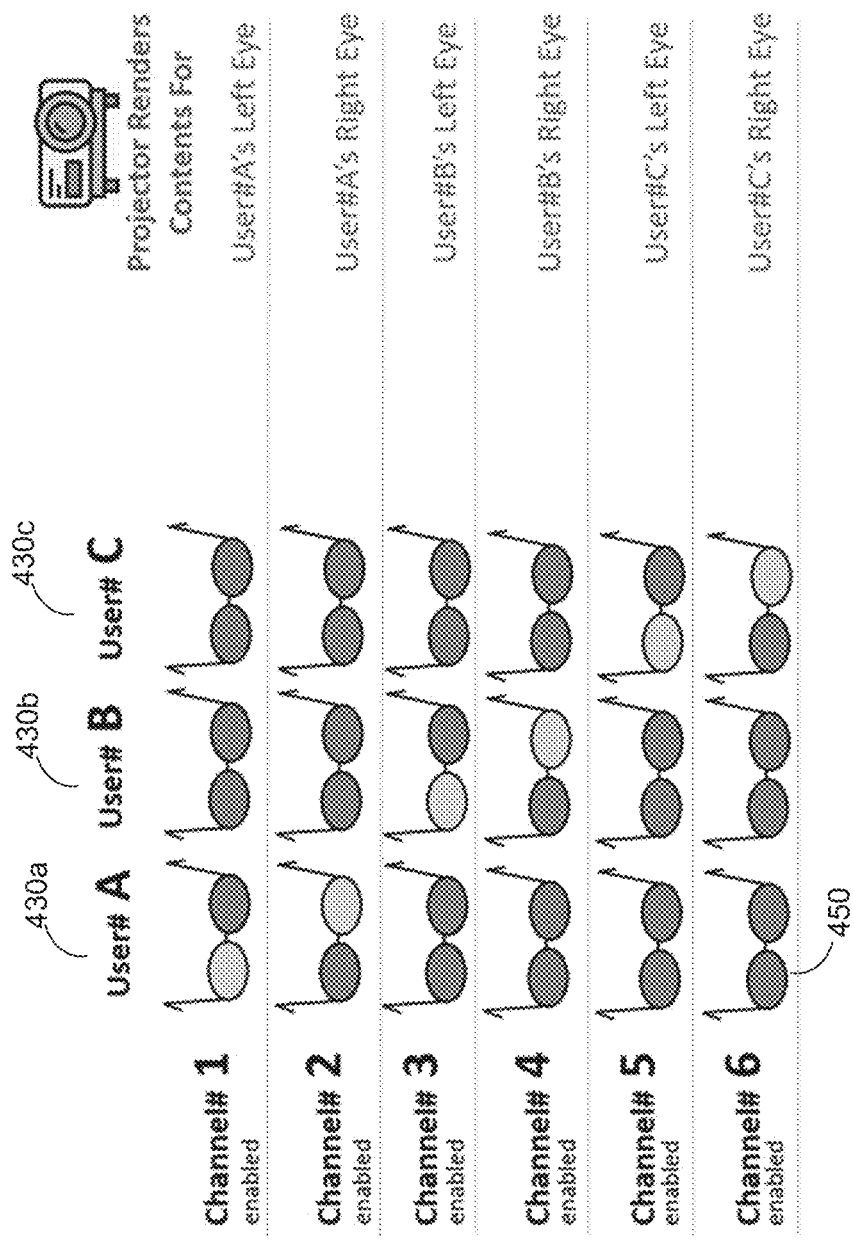

FIGS. 9A and 9B illustrate example details of multi-user support in an environment 900 in which a mixed reality image is projected and viewed, in accordance with this disclosure. The environment 900 can be the same as, or similar to, the environment 400 of FIG. 4, except that instead of one user, there are multiple users. For example, in FIGS. 9A and 9B, there are three users 430a-430c; in other embodiments, there may be only two users or there may be greater than three users.

As shown in FIG. 9A, the three users 430a-430c—User A, User B, and User C—are wearing 3D glasses 450 that enable each user 430a-430c to view the 3D image 460 on the projection surface 420. Because each user 430a-430c is at a different location and has a different head pose, the users 430a-430c perceive the 3D image 460 differently. Accordingly, the projection system 410 must generate different images 440 that are perspective correct for each user 430a-430c. More particularly, the different image must be perspective correct for each eye of each user 430a-430c.

In multi-user systems in general, if N is number of users looking at a scene, then the count of the eyes looking at the scene is N×2. The projection system generates N×2 unique perspective correct projections for every eye looking at the scene. Typical 3D glasses systems contains two channels. Using active shutters or polarization filters in the lenses, one of the lenses of the glasses blocks at a time to reveal image contents to the corresponding eye. For multi-user environments, the number of channels can be extended to N×2.

In the environment 900, N=3 and N×2=6. As shown in FIG. 9B, there are six channels for the projection system 410, where each channel corresponds to one eye of one user 430a-430c. Each channel represents one projected image 440 from the projection system 410, and the images 440 are projected sequentially in a cycle, such that a single channel is enabled at a time. In some projection systems, the refresh rate is 60 Hz for a single user (e.g., 30 Hz for each eye of the user). For N users, the refresh rate can be scaled up to 60 Hz×N. This is needed to assure that each user will get his/her own 60 Hz refresh rate. In other embodiments, the refresh rate is 60 Hz for each eye of each user. In such embodiments, the refresh rate may need to be scaled to 60 Hz×2N for N users. Other refresh rates may be used and scaled accordingly based on the examples provided above.

The six-channel, 3D glasses system illustrated in FIGS. 9A and 9B allows unique contents to each of the six eyes, one at a time. Each of the users 430a-430c sees content that is perspective correct for the user. In order to keep the intensity of the scene uniform, the projector intensity can be raised by N times. This multiplication factor for the projector intensity assures that there is little or no degradation of the viewed 3D image due to viewing by multiple viewers.

Figure 10:
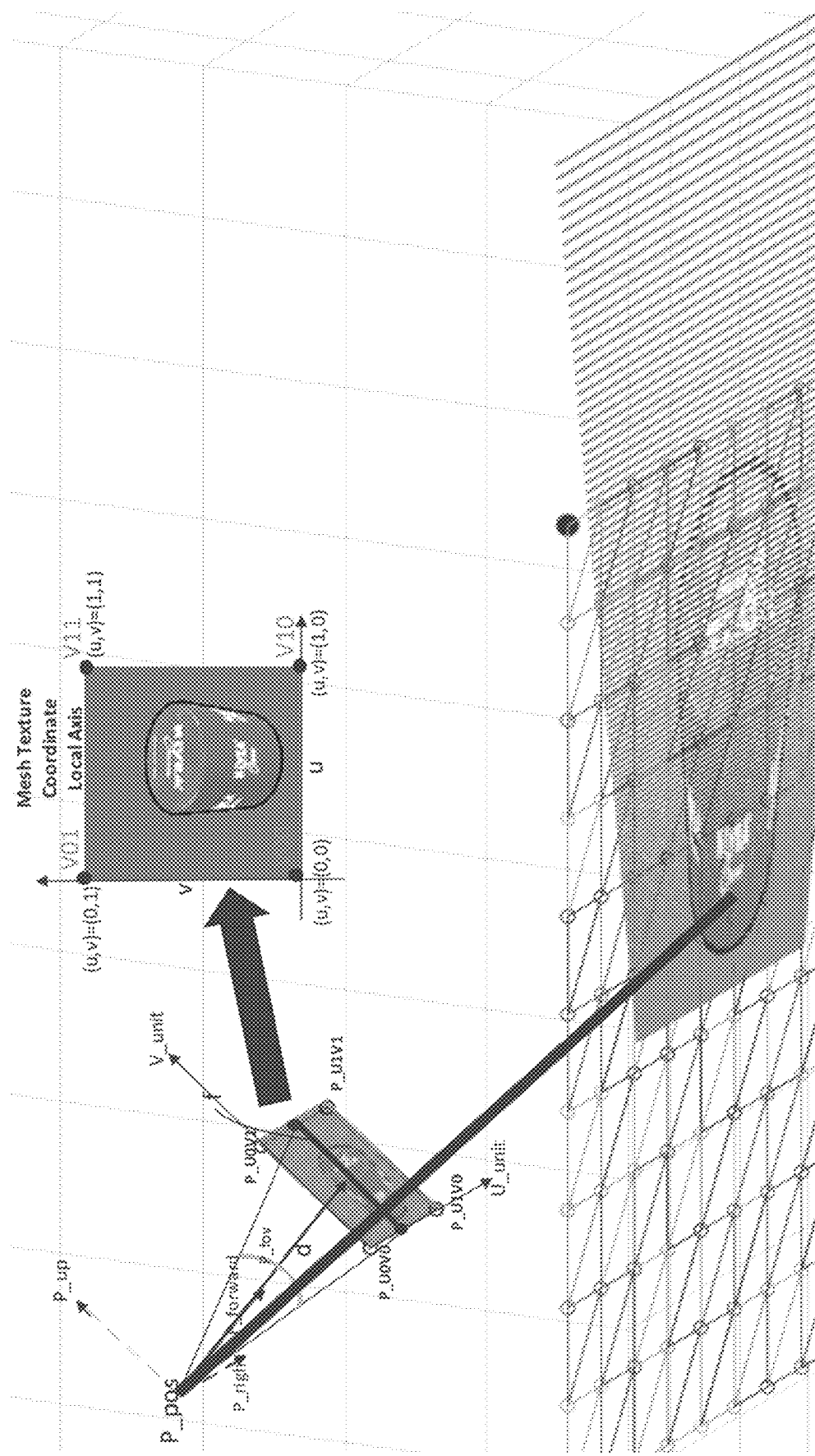
FIG. 10 illustrates additional details for generating and projecting images onto a projection surface in accordance with this disclosure.

FIG. 10 illustrates additional details for generating and projecting images onto a projection surface in accordance with this disclosure.

As shown in FIG. 10, the following terms refer to points, vectors, and other variables used in determining a projected image (e.g., one image 440) for one user (e.g., one user 430):

$P_{pos}$—3D Vector: Position of the user's eye (L or R).
$P_{forward}$—3D Vector: Direction of user's eye (L or R).
$P_{up}$—3D Vector: Up direction relative to the user's eye, perpendicular to $P_{forward}$.
$P_{right}$—3D Vector: Right direction relative the user's eye, perpendicular to $P_{forward}$ ($P_{forward}$, $P_{up}$ and $P_{right}$ are axis vectors for the user's eye (L or R)).
$P_{fov}$—Field of view of cameras, which rendered the image in a 2D buffer in the projection system.
f—Width/height of the image.
d—Distance between the user's eye (L or R) and the middle of the 2D image.
$P_{U1V0}, P_{U0V0}, P_{U0V1}, P_{U0V0}$: 3D Vectors—Positions of the 4 corners of the 2D image.
$V_{img\_proj}$—3D Vector: Projection of a pixel of the 2D image onto the projection surface.

These values can be used in a mesh texture coordinate system with local axis coordinates that correspond to the projected image on the projection surface. The mesh texture coordinate system is useful in projection systems with limited processing power that makes it difficult or impossible to mathematically calculate the location of every pixel of the projected image. The following calculations apply in the mesh texture coordinate system.

$$P_{right} = (P_{up} \times P_{forward}) / |P_{up} \times P_{forward}| \quad (1)$$

$$U_{unit} = P_{right} \quad (2)$$

$$V_{unit} = P_{up} \quad (3)$$

$$d = f^* \tan(P_{fov}/2) \quad (4)$$

$$P_{U0V0} = P_{pos} + P_{forward}{}^*f + P_{right}{}^*(-d) + P_{up}{}^*(-d) \quad (5)$$

$$P_{U0V1} = P_{pos} + P_{forward}{}^*f + P_{right}{}^*(-d) + P_{up}{}^*(d) \quad (6)$$

$$P_{U1V0} = P_{pos} + P_{forward}{}^*f + P_{right}{}^*(d) + P_{up}{}^*(-d) \quad (7)$$

$$P_{U1V1} = P_{pos} + P_{forward}{}^*f + P_{right}{}^*(d) + P_{up}{}^*(d) \quad (8)$$

The image projection can be determined according to the following vector equation:

$$V_{img\_proj} = P_{U0V0} + u^*(P_{U1V0} - P_{U0V0}) + v^*(P_{U0V1} - P_{U0V0}) \quad (9)$$

The vector equation (9) can be decomposed into a set of three vector equations corresponding to X, Y, and Z axes:

$$V_{img\_proj.x} = P_{U0V0.x} + u^*(P_{U1V0.x} - P_{U0V0.x}) + v^*(P_{U0V1.x} - P_{U0V0.x}) \quad (10)$$

$$V_{img\_proj.y} = P_{U0V0.y} + u^*(P_{U1V0.y} - P_{U0V0.y}) + v^*(P_{U0V1.y} - P_{U0V0.y}) \quad (11)$$

$$V_{img\_proj.z} = P_{U0V0.z} + u^*(P_{U1V0.z} - P_{U0V0.z}) + v^*(P_{U0V1.z} - P_{U0V0.z}) \quad (12)$$

The three vector equations (10)-(12) can be solved for (u,v) as follows:

$$u = (P_{U0V0.x}{}^*P_{U0V1.y} - P_{U0V0.y}{}^*P_{U0V1.x} - P_{U0V0.x}{}^*V_{img\_proj.y} + P_{U0V0.y}{}^*V_{img\_proj.x} + P_{U0V1.x}{}^*V_{img\_proj.y} - P_{U0V1.y}{}^*V_{img\_proj.x}) / (P_{U0V0.x}{}^*P_{U0V1.y} - P_{U0V0.y}{}^*P_{U0V1.x} - P_{U0V0.x}{}^*P_{U1V0.y} + P_{U0V0.y}{}^*P_{U1V0.x} + P_{U0V1.x}{}^*P_{U1V0.y} - P_{U0V1.y}{}^*P_{U1V0.x}) \quad (13)$$

$$v = -(P_{U0V0.x}{}^*P_{U1V0.y} - P_{U0V0.y}{}^*P_{U1V0.x} - P_{U0V0.x}{}^*V_{img\_proj.y} + P_{U0V0.y}{}^*V_{img\_proj.x} + P_{U1V0.x}{}^*V_{img\_proj.y} - P_{U1V0.y}{}^*V_{img\_proj.x}) / (P_{U0V0.x}{}^*P_{U0V1.y} - P_{U0V0.y}{}^*P_{U0V1.x} - P_{U0V0.x}{}^*P_{U1V0.y} + P_{U0V0.y}{}^*P_{U1V0.x} + P_{U0V1.x}{}^*P_{U1V0.y} - P_{U0V1.y}{}^*P_{U1V0.x}) \quad (14)$$

Once the projection system has modeled the image to be projected using the mesh texture coordinate system and the calculations shown above, the projection system can then determine the actual 2D image using interpolation, and project the resulting image on the projection surface.

The embodiments described above are advantageous for providing a mixed reality experience to one or more users wherever there is a suitable projection surface. For example, the disclosed embodiments can be used in a school, museum, or other education setting to allow users to view, analyze, and study virtual objects from different perspectives for learning. In a particular scenario, an image of a world globe could be projected onto a table surface in a classroom. When viewed through 3D glasses, the world globe may appear as a 3D globe floating above the table surface. The projection system could be instructed to rotate the globe image, or the students could walk around the table to view the globe image from different angles. The globe image could display geographical or political features for examination by the students.

As another example, the disclosed embodiments can be used in an office environment to facilitate discussions and understanding of business topics, such as landscapes, construction sites, and the like. In a particular scenario, a 3D image of a building or a construction site could be projected so that architects, engineers, and the like could more readily identify issues than they could by viewing a 2D blueprint. As yet another example, the disclosed embodiments can be used in medical environments so that medical professionals can view models of human anatomy or study a patient case. In a particular example, a 3D image of a patient's knee joint could be projected to assist a surgeon in preparation for surgery.

The embodiments described above are not meant to be limiting and are merely illustrative of various aspects of this disclosure. While example embodiments may be indicated as applicable to a particular device category (such as mobile devices, servers, etc.), the processes and examples provided above are not intended to be solely limited to those device categories and can be broadly applicable to various device categories (such as appliances, computers, automobiles, smart speakers, IoT devices, etc.).

While the figures have been described and novel features as applied to various embodiments have been pointed out above, it will be understood that various omissions, substitutions, and changes in the form and details of the systems, devices, or processes described above may be made by those skilled in the art without departing from the scope of this disclosure. This description is in no way meant to be limiting but rather should be taken as illustrative of the general principles of this disclosure.

Although this disclosure has been described with reference to various example embodiments, various changes and modifications may be suggested to one skilled in the art. It is intended that this disclosure encompass such changes and modifications as fall within the scope of the appended claims.

What is claimed is:

1. An electronic device comprising:
    an image sensor;
    a projector;
    an adjustable mount to which the image sensor and the projector are connected;
    a processor coupled to the image sensor, the projector, and the adjustable mount; and
    a memory coupled to the processor, the memory storing instructions executable by the processor to:
        receive at least one first image of an environment around the electronic device from the image sensor while the image sensor is connected to the adjustable mount;
        determine a face pose of each of multiple viewers positioned at different locations based on the at least one first image received from the image sensor;
        receive at least one second image of the environment from the image sensor while the image sensor is oriented toward a portion of a projection surface where the viewers are gazing;
        determine characteristics of the projection surface based on the at least one second image;
        determine a plurality of images for projection onto the projection surface, the images determined by the processor based at least in part on the face poses of the viewers and the characteristics of the projection surface determined by the processor, wherein the images are determined by the processor to be perceived as a three-dimensional (3D) object image when projected onto the projection surface and viewed through 3D glasses associated with each of the viewers, wherein the images comprise subsets of images that are perspective correct for each viewer based on a location of that viewer;
control the projector to project the plurality of images onto the projection surface; and
control the adjustable mount to adjust a position or an orientation of the projector based at least in part on a change in at least one of the face poses of at least one of the viewers.

2. The electronic device of claim 1, wherein:
the face pose of each viewer comprises positions of a left eye and a right eye of that viewer;
the plurality of images comprises a left image and a right image corresponding to each viewer; and
the left image is determined based at least in part on the position of the left eye and the right image is determined based at least in part on the position of the right eye.

3. The electronic device of claim 2, wherein the left image is configured to be viewed through a left lens of the 3D glasses associated with that viewer and the right image is configured to be viewed through a right lens of the 3D glasses associated with that viewer.

4. The electronic device of claim 3, wherein the instructions to control the projector to project the plurality of images onto the projection surface comprise instructions to:
sequentially project the left images and the right images for the multiple viewers in a cycle that is synchronized to active shutter cycles of the 3D glasses associated with the multiple viewers.

5. The electronic device of claim 1, wherein the memory further stores instructions executable by the processor to:
receive one or more third images of the environment around the electronic device from the image sensor;
determine at least one updated face pose of at least one of the viewers based on the one or more third images; and
control the projector to project updated images onto the projection surface, the updated images based at least in part on the at least one updated face pose of the at least one viewer.

6. The electronic device of claim 1, further comprising:
a motorized mobile platform coupled to the projector, the motorized mobile platform configured to move the electronic device around a room or to a different room.

7. The electronic device of claim 1, further comprising:
a communication unit coupled to the processor, the communication unit configured to (i) receive at least one of position information or orientation information of a head of each viewer from an inertial motion unit (IMU) disposed in the 3D glasses associated with that viewer, and (ii) output the at least one of position information or orientation information of the head of that viewer to the processor before the processor determines the face pose of that viewer.

8. A method comprising:
receiving, from an image sensor, at least one first image of an environment around a mixed reality projection device, wherein the image sensor is connected to an adjustable mount that is connected to a projector;
determining a face pose of each of multiple viewers positioned at different locations based on the at least one first image received from the image sensor;
receiving, from the image sensor, at least one second image of the environment while the image sensor is oriented toward a portion of a projection surface where the viewers are gazing;
determining characteristics of the projection surface based on the at least one second image;
determining a plurality of images for projection onto the projection surface using the projector, the images determined based at least in part on the face poses of the viewers and the characteristics of the projection surface, wherein the images are determined to be perceived as a three-dimensional (3D) object image when projected onto the projection surface and viewed through 3D glasses associated with each of the viewers, wherein the images comprise subsets of images that are perspective correct for each viewer based on a location of that viewer;
controlling the projector to project the plurality of images onto the projection surface; and
adjusting a position or an orientation of the projector based at least in part on a change in at least one of the face poses of at least one of the viewers.

9. The method of claim 8, wherein:
the face pose of each viewer comprises positions of a left eye and a right eye of that viewer;
the plurality of images comprises a left image and a right image corresponding to each viewer; and
the left image is determined based at least in part on the position of the left eye and the right image is determined based at least in part on the position of the right eye.

10. The method of claim 9, wherein the left image is configured to be viewed through a left lens of the 3D glasses associated with that viewer and the right image is configured to be viewed through a right lens of the 3D glasses associated with that viewer.

11. The method of claim 10, wherein projecting the plurality of images onto the projection surface using the projector comprises:
sequentially projecting the left images and the right images for the multiple viewers in a cycle that is synchronized to active shutter cycles of the 3D glasses associated with the multiple viewers.

12. The method of claim 8, further comprising:
receiving one or more third images of the environment around the mixed reality projection device from the image sensor;
determining at least one updated face pose of at least one of the viewers based on the one or more third images; and
projecting updated images onto the projection surface using the projector, the updated images based at least in part on the at least one updated face pose of the at least one viewer.

13. The method of claim 8, further comprising:
moving the mixed reality projection device around a room or to a different room using a motorized mobile platform coupled to the projector.

14. The method of claim 8, further comprising:
receiving, at a communication unit, at least one of position information or orientation information of a head of each viewer from an inertial motion unit (IMU) disposed in the 3D glasses associated with that viewer, wherein the at least one of position information or orientation information is used for determining the face pose of that viewer.

15. A non-transitory computer readable medium containing computer readable program code that, when executed, causes at least one processor to:
- receive at least one first image of an environment around a mixed reality projection device from an image sensor, wherein the image sensor is connected to an adjustable mount that is connected to a projector;
- determine a face pose of each of multiple viewers positioned at different locations based on the at least one first image received from the image sensor;
- receive at least one second image of the environment from the image sensor while the image sensor is oriented toward a portion of a projection surface where the viewers are gazing;
- determine characteristics of the projection surface based on the at least one second image;
- determine a plurality of images for projection onto the projection surface, the images determined by the at least one processor based at least in part on the face poses of the viewers and the characteristics of the projection surface determined by the at least one processor, wherein the images are determined by the at least one processor to be perceived as a three-dimensional (3D) object image when projected onto the projection surface and viewed through 3D glasses associated with each of the viewers, wherein the images comprise subsets of images that are perspective correct for each viewer based on a location of that viewer;
- control the projector to project the plurality of images onto the projection surface; and
- control the adjustable mount to adjust a position or an orientation of the projector based at least in part on a change in the face pose of at least one of the viewers.

16. The non-transitory computer readable medium of claim 15, wherein:
- the face pose of each viewer comprises positions of a left eye and a right eye of that viewer;
- the plurality of images comprises a left image and a right image corresponding to each viewer; and
- the left image is determined based at least in part on the position of the left eye and the right image is determined based at least in part on the position of the right eye.

17. The non-transitory computer readable medium of claim 16, wherein the left image is configured to be viewed through a left lens of the 3D glasses associated with that viewer and the right image is configured to be viewed through a right lens of the 3D glasses associated with that viewer.

18. The non-transitory computer readable medium of claim 17, wherein the computer readable program code, when executed, further causes the at least one processor to:
- sequentially project the left images and the right images for the multiple viewers in a cycle that is synchronized to active shutter cycles of the 3D glasses associated with the multiple viewers.

19. The non-transitory computer readable medium of claim 15, wherein the computer readable program code, when executed, further causes the at least one processor to:
- receive one or more third images of the environment around the mixed reality projection device from the image sensor;
- determine at least one updated face pose of at least one of the viewers based on the one or more third images; and
- control the projector to project updated images onto the projection surface, the updated images based at least in part on the at least one updated face pose of the at least one viewer.

20. The non-transitory computer readable medium of claim 15, wherein the computer readable program code, when executed, further causes the at least one processor to:
- control a motorized mobile platform to move the mixed reality projection device around a room or to a different room, wherein the motorized mobile platform is coupled to the projector.

* * * * *